July 4, 1961  A. T. SPEES  2,991,000
TEAR STRIP MEANS FOR PLASTIC PACKAGING
Filed Oct. 4, 1956  2 Sheets-Sheet 1

*INVENTOR.*
ARTHUR T. SPEES
BY
*Mason & Graham*

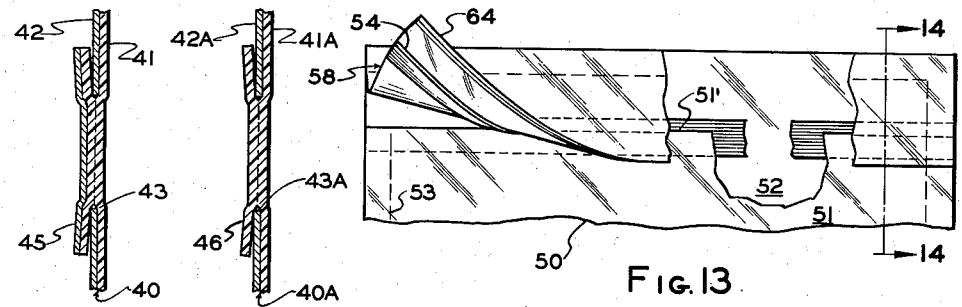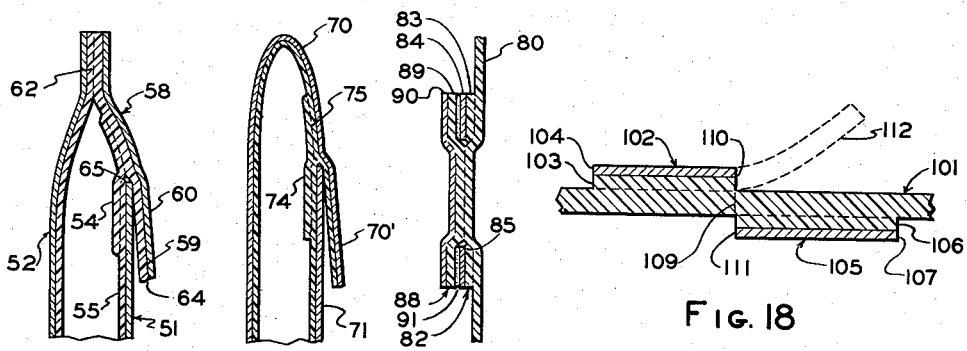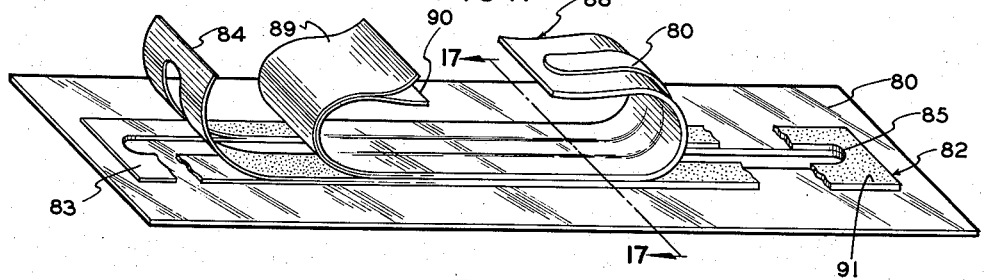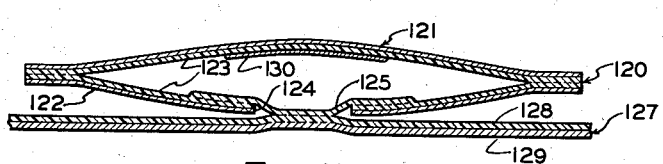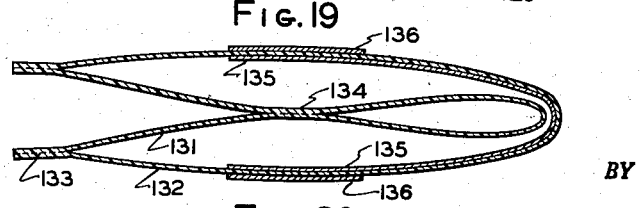

United States Patent Office 2,991,000
Patented July 4, 1961

2,991,000
TEAR STRIP MEANS FOR PLASTIC PACKAGING
Arthur T. Spees, 2540 W. 7th St., Los Angeles 57, Calif.
Filed Oct. 4, 1956, Ser. No. 613,850
13 Claims. (Cl. 229—51)

This invention has to do generally with means for tearing plastic sheet material to provide an opening therein and more particularly with what I shall term a "tear seal" for incorporation into plastic containers, wrappings and sheets to provide an easily operated means of tearing them in a predetermined region.

In recent years plastic sheet material has been widely adopted for perishable products as well as for other products of a more durable nature. While sheet materials of a single plastic give good protection for many products for a short period of time, they do not as a rule provide adequate long-range protection. Single sheets of most plastic packaging materials are not in themselves absolutely tight since they have the ability to transmit certain vapors and moistures. Various liquids contained in a single weight plastic package which is completely sealed will actually vaporize within the package and pass through the pores of the material. Also, the ability to effect an absolute bond or seal of the single plastic sheet is difficult, except where thermoplastic sheet materials are used which can be integrally fused together with heat and pressure.

In developing flexible packaging materials which provide the most permanent protection for the product and which can be positively sealed and closed, laminates have been produced which consist of an inner layer of a thermoplastic film laminated to one or more outer layers of a non-thermoplastic material. The latter may or may not be a plastic.

A common type of packaging utilizing laminated material is a bag or pouch which is formed of two sheets of material (or a single folded sheet) with the inner layers of thermoplastic material heat sealed together at the margins.

Irrespective of whether the container is made of laminate or single thermoplastic material, it is difficult to tear the material for the purpose of providing an opening in the package. In this connection it may be pointed out that most of the thermoplastics which form the inner (or sole) layer of these packages are very tough and elastic in nature and do not tear readily, but stretch and break like rubber. When a person is successful in tearing the material by hand, the tear line is unpredictable and cannot be confined to a desired region. It will be seen, therefore, that a tear seal which will function to provide an opening of predetermined shape and size and one which does not weaken the strength of the package or lessen the protection given the contents, would be a desirable addition in this field. While I am aware that various types of tear strips have been provided for packages, so far as I know, none is entirely suitable for the type of materials I have discussed above.

An object of the invention therefore is to provide a novel and improved tear seal construction designed especially for incorporation in plastic sheeting of the type described for use in providing a convenient, easily used means of opening a container made of such material without using any external aids, such as a knife or other cutting instrument.

Another object is to provide a tear seal for this type of laminated plastic sheet which has the same tightness as the material and which is applicable to vacuum and liquid packaging.

Another object is to provide a novel method of making a tear seal in sheet material of the type indicated.

A further object is to provide a novel tear seal construction for a single layer plastic sheet and for a laminated plastic sheet which, until used, provides protection for the contents of a package made of such sheet equal to the sheet itself. In this connection it is an object to provide a tear seal made of the same material as the sheet material with which it is associated.

Still another object is to provide a tear seal which, when used, produces an opening, or series of openings, of predetermined size and shape which is reinforced at its margins and thus not subject to tearing beyond the predetermined limits, thereby facilitating subsequent closure of the package on a temporary basis as by folding over a portion thereof past the opening provided therein.

A further object is to provide a tear seal construction which is flexible and permits of being used to produce openings of unusual shape, size or design as well as a predetermined pattern of such openings.

A still further object is to provide a tear seal construction which can be incorporated readily in sheet material at the time of manufacture or which can be incorporated in a container by container fabricating, filling and closing machines.

Still another object is to provide a tear seal having a convenient pull-tab which is so anchored as to resist accidental premature operation as during handling of the package.

These and other objects will be apparent from the drawings and description which follows. Referring to the drawings:

FIG. 11 is a view similar to FIG. 6 showing an alternate form of the invention;

FIG. 12 is a view similar to FIG. 6 but showing another form of the invention;

FIG. 13 is a fragmentary face view of the side of a bag embodying a modified form of seal construction;

FIG. 14 is an enlarged fragmentary sectional view on line 14—14 of FIG. 13;

FIG. 15 is a view similar to FIG. 14 but showing a different form of bag construction;

FIG. 16 is a perspective view of a plastic sheet showing a modified form of tear seal applied thereto, the view being partly broken away with certain portions of the parts shown pulled away;

FIG. 17 is a sectional view on line 17—17 of FIG. 16;

FIG. 18 is a cross-sectional view through a plastic sheet having a simple form of tear seal construction, illustrating the basic principles involved in the tear seals of the foregoing figures;

FIG. 19 is a sectional view through a container shown attached to a mounting sheet and embodying a tear seal construction; and FIG. 20 is a central sectional view through a self-opening plastic bag or pouch.

Figure 1:
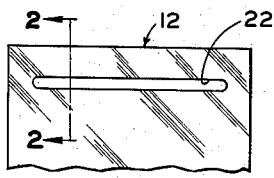
FIG. 1 is a fragmentary plan view of a laminated plastic sheet.
Figure 3:
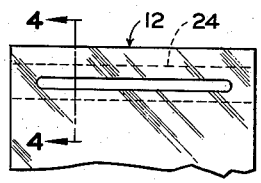
FIG. 3 is a view similar to FIG. 1 but showing a further step in the process.
Figure 5:
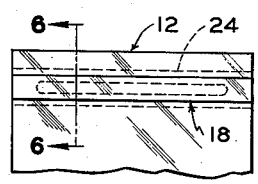
FIG. 5 is a view similar to FIGS. 1 and 3 but showing the completed tear seal.
Figures 2, 4, 6:
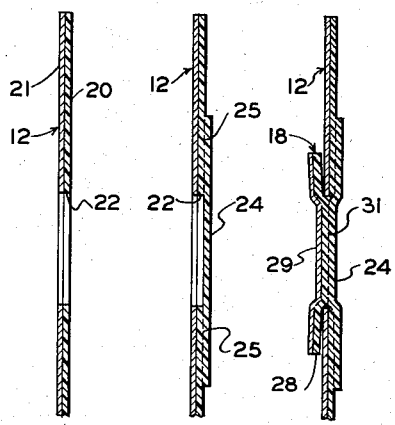
FIG. 2 is an enlarged sectional view on line 2—2 of FIG. 1.
FIG. 4 is an enlarged sectional view on line 4—4 of FIG. 3.
FIG. 6 is an enlarged sectional view on line 6—6 of FIG. 5.
Figure 7:
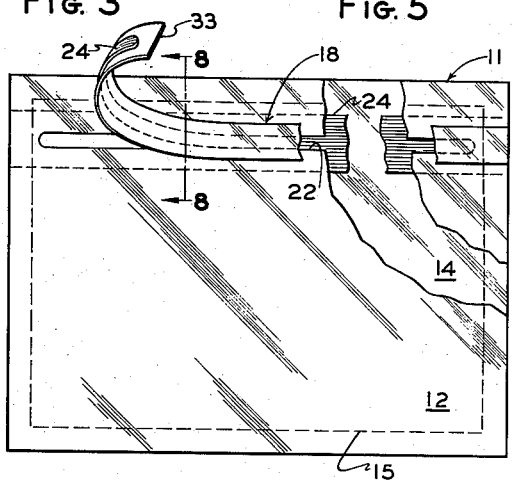
FIG. 7 is a face view of the side of a bag-like container having the seal of the invention embodied therein and shown partly torn away, the view being partly broken away.

More particularly describing the invention, my tear seal is applicable to many different types of materials but is designed chiefly for use with material which is in part at least made up of a layer of thermoplastic material, such as one of the many plastics now in common use for packaging. The tear seal is applicable to laminated sheets as well as sheets made of a single thermoplastic layer. First, by way of example, I show a tear seal applied to a container in the form of a bag or pouch made of laminated plastic sheet material, the container being designated generally by numeral 11 (FIG. 7). As is customary, this container is made of two sheets designated 12 and 14 of plastic laminate which are joined or fused together by the application of heat and pressure at their marginal portions outwardly of the broken line 15 to form a bag. In some cases a single sheet folded upon itself is used in place of two sheets. The tear seal of the invention is designated generally by numeral 18.

In the method of making the tear seal the successive steps therein are best illustrated in FIGS. 1–6. Referring to these figures, numeral 12 designates a sheet of plastic material which is shown as two-ply laminate consisting of an inner layer 20 of a thermoplastic plastic and a supporting outer layer 21 of some other material which is not thermoplastic in the same low temperature range as material 20. The layer 20, by way of example, may be any of the well-known materials, such as polyethylene or polyvinyl, which are suitable for heat-sealing. The outer layer 21 may be cellophane or it may be an entirely different substance, such as paper or metal foil, or a combination of such materials, the layer 21 being adhered or otherwise attached to the layer 20. The first step in the process is to provide an opening or hole in the layer 21. This of course possibly may be done at the time of manufacture of the laminated sheet 12 where the ultimate position of the opening is known at the time of manufacture. However, this may not be practical and consequently it is assumed that the opening is made subsequent to the manufacture of the sheet. Thus in FIGS. 1 and 2 I show a slot or opening 22 in the sheet provided by punching or in any other suitable manner. Since it is impracticable only to provide an opening in the outer sheet or layer 21, I show the opening 22 as extending through both layers of sheet 12. The next step in the process is to close the opening 22 or, in other words, replace the removed section of the inner layer 20, by the application of an unsupported strip 24 of thermoplastic material which may be the same material as the layer 20. The strip 24 is applied over the surface of layer 20 to provide a bordering region on the slot 22 and is fused to layer 20 by application of heat and pressure.

In the next step of the process I apply what I term the tear seal member 18. This is shown as comprising a strip of material having an inner layer 28 of a thermoplastic material which may be the same as the material of layer 20 of sheet 12, or one compatible to uniting therewith. Laminated to this is a supporting or outer layer 29 which may be the same as material 21 although this is not essential. The tear seal strip 18 is applied over the slot 22 and is sufficiently wide to overlie the marginal regions thereof. It is then fused to the strip 24 in the region 31 by the application of heat and pressure thereby firmly uniting inner layer 28 of the tear strip to strip 24.

Figures 6A, 8, 8A:
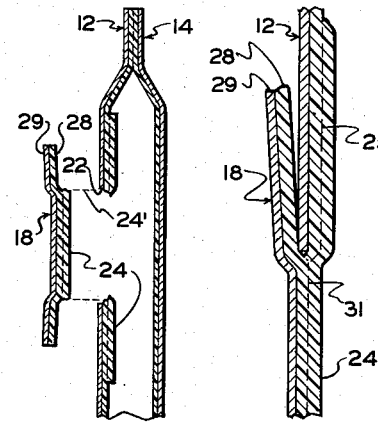
FIG. 6A is a detail fragmentary section in the same plane as FIG. 6 but on a larger scale.
FIG. 8 is an enlarged fragmentary sectional view on line 8—8 of FIG. 7.
FIG. 8A is a detail fragmentary section in the same plane as FIG. 8 but on a larger scale.

I believe it essential that inner layer 28 of the tear seal strip be thicker or at least stronger than layer 24 so that when the tear seal is subsequently removed strip 24 will give way and be pulled out through the opening 22 as shown in FIG. 8. With the uniting of the tear seal strip and strip 24 the two become fused to form a single, relatively thick sheet of thermoplastic material throughout the area of opening 22.

Since the laminate 21 of the sheet 12 is not compatible to uniting with the material of the laminate layer 28 of the tear seal by application of heat and pressure, the tear seal strip remains free of the outer laminate 21. The tear seal can be extended beyond one end of the opening 22 to provide a free pull-tab portion such as that designated 33 in FIG. 7. If desired, an adhesive or weak cement may be used to anchor the portion of the tear seal member 18 which overlies the outer surface of sheet 12 to such surface.

It will be apparent that the tear seal and body has physical and protective qualities equal to or better than the original sheet material, the total thickness of material in the region of the tear seal being greater than at any portion of sheet 12.

As previously indicated, the tear seal layer 28 should be thicker or stronger than the member 24 and I have found that it is also preferable to make the member 24 somewhat thicker than the inner laminate 20 of sheet 12. By way of example, if we assume laminate 20 is one and one-half mils thick, the member 24 may well be two mils thick. The layer 28 then should be about three mils in thickness. By maintaining this balance of strength between the tear seal 18 and the inner strip 24, the final strength of the tear seal can be fully controlled and tear seals for very heavy gauges of laminated plastic and for single sheets of thermoplastic materials can be effectively produced.

When the tear strip is removed as by grasping one end and pulling lengthwise of the opening 22 and away from sheet 12, a clean break is effected of the inner lining material 24 at the marginal edges 24′ as best shown in FIGS. 8 and 8A. This occurs by reason of the fact that this is the weakest point in the region of the opening, since the marginal portions of the strip 24 are reinforced by additional thicknesses of supported thermoplastic material. The strip 24, which is a single sheet of unsupported thermoplastic material, is firmly sealed to the thermoplastic sheet 20 outwardly from the edge of the slot 22 and the sheet 20 is in turn supported by its outer layer 21. The strip 24 is also firmly sealed to the thermoplastic inner surface of the tear seal 28 inwardly from the edge of the slot 22 and the tear seal 28 is in turn supported by its outer surface 29. Any tendency therefore of the thermoplastic member 24 to stretch or pull away from the edge 24′ and resist tearing is precluded by the fact that it is united with thermoplastic materials which are supported by outer layers of material which do not have the characteristic of stretching under tension. The strip 24 is therefore forced to tear at the exact edge 24′ with the removal of the tear seal strip 18, since this is the only point where the strip 24 is not reinforced or supported by a stronger non-stretching material.

It will be noted in FIG. 6A that in the process of sealing the thermoplastic layers 28 and 24 through slot 22 that the adjacent edge of thermoplastic sheet 20 has flowed around the edge of the non-thermoplastic sheet 21 and has united with layers 28 and 24 at the edge 24′ to form a solid fusion of all thermoplastic surfaces at this point, and thus cause a strong and positive closing of the package at the weakest point of the tear seal.

Figure 9:
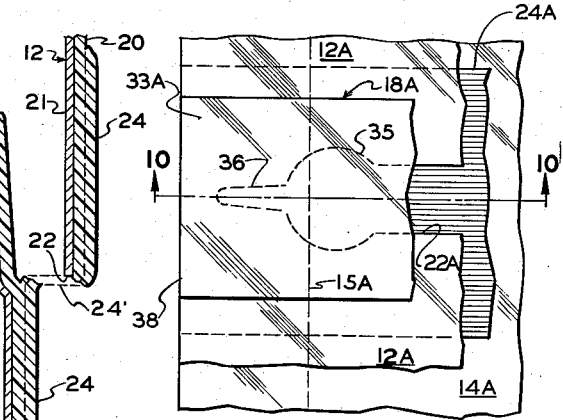
FIG. 9 is a fragmentary plan view of the end portion of a modified tear seal construction.
Figure 10:
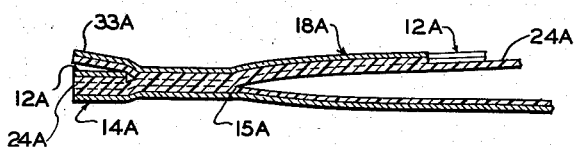
FIG. 10 is a sectional view on line 10—10 of FIG. 9.

In FIGS. 9 and 10 I show a means of more firmly anchoring the pull-tab end 33A of the tear strip 18A. In this modification the front or near sheet is designated 12A, the rear or far sheet 14A, the backing sheet 24A and the opening or slot in the sheet 12A as 22A. It will be noted that opening 22A has been extended into a rounded or bulbous end portion, designated 35, and that beyond this, it is provided with an extension or tongue 36. A part of the portion 35 and the tongue 36 extend into the area of fusion between the front and rear sheets of the package, such area being that to the left of the broken line 15A. With this construction the tear seal member 18A is fused into the area of the fused seal at the edge of the package. The tongue portion of the slot extends nearly to the edge 38 of the package and therefore serves to hold the pull-tab end portion 33A of the tear seal strip 18A close against the sheet 12A. The design also provides a certain safety margin of tearing before breaking the airtight seal, since this is not accomplished until the tear has progressed inwardly of the line 15A. Further, the shape and size of the anchor through the bulbous portion 35 and extension 36 of the slot assist in insuring a positive start of the tearing action in the required area.

As previously indicated, in some instances it may be possible in the course of manufacture of the laminated sheet material that an opening could be provided in merely the layer of non-thermoplastic plastic material. This would eliminate the necessity of adding a strip 24 as previously described except where added strength was desired. Thus in FIG. 11 I show in section a portion of a plastic sheet, designated 40, having a thermoplastic layer 41 and a layer 42 which may be any of various materials, such as plastic, paper, foil or the like, not thermoplastic in the same temperature range with layer 41. In this instance it will be apparent that an opening or hole 43 is provided in just the layer 42, thereby exposing the desired area of the layer 41. A tear seal member, designated 45, which may be the same in all respects as the tear seal member 18 previously described, is shown covering the opening and fused to the laminate 41.

While I have heretofore shown a tear seal formed of laminated material, this is not essential, provided the tear seal is sufficiently thick or strong and is resistant to stretching. In FIG. 12 I show a sheet 40A which may be considered the same as sheet 40, having an opening 43A in the front layer 42A. Here I provide a tear seal member 46 which is comprised of a single, relatively thick layer of tear resistant thermoplastic material united with the portion of layer 41A exposed through opening 43A.

In FIGS. 13 and 14 I show an alternate form of construction wherein I provide a combined tear seal and bag closure. Numeral 50 designates a bag having a laminated front sheet 51 and a similar rear sheet 52, the two being closed around their margins outwardly of the broken line 53 by being fused together in that region. Sheets 51 and 52 may be of the general type described for sheets 12 and 14. The upper edge 51' of sheet 51 terminates short of the corresponding edge of sheet 52. I attach a thermoplastic strip 54 to this edge in the manner shown in FIG. 14 by the application of heat and pressure, the inner layer 55 of sheet 51 also being of thermoplastic material. I then provide a combined closure and tear seal member, designated generally 58, which I use to close the bag. This member has an inner thermoplastic layer 59 and an outer layer 60 of different material. The thermoplastic layer is united with the strip 54 where the latter projects beyond the edge 51' of sheet 51 and also united with the inside of sheet 52 in the region 62. This is accomplished by the application of heat and pressure.

It will be apparent that by pulling upon the lower portions 64 of the strip 58 that the flap 54 will be torn along the region 65 and in this connection it should be pointed out that the tear seal should be stronger than strip 54 as by making the inner layer 59 thicker than strip 54. The tearing action of the strip 54 along region or line 65 is similar to that of the slot type tear seal along line 24' of FIG. 8 as previously described.

Referring now to FIG. 15 which illustrates the upper end of a bag in cross section, the bag being formed by a sheet 70 and a sheet 71 each of laminated material of the type heretofore discussed. This tear seal construction is particularly adaptable to light weight pouches and to machine operations where the pouch is automatically formed, filled and sealed. Here sheet 71 has been provided with a marginal strip 74 of thermoplastic material. When sheet 70 is brought over, it is fused to sheet 74 in the region 75, leaving the exposed free marginal portion 70'.

In FIGS. 16 and 17 I show a form of tear seal for application to packages or containers which are made of a sheet of thermoplastic plastic alone. Referring to these figures, numeral 80 designates a sheet of unsupported thermoplastic material, such as polyethylene, or the like. I provide a reinforcement strip 82 which is laminated and may consist of a layer 83 of thermoplastic material and a supporting layer 84 of stretch-resistant non-thermoplastic material. The reinforcement member has a slot or opening 85 of desired shape and size through both layers thereof. Over the reinforcement member I apply a tear seal member or strip 88 which may be the same as the tear seal member 18 previously described, that is, it is laminated and consists of an inner layer 89 of thermoplastic plastic and an outer layer 90 of different material. This is applied over the reinforcement member and is united with sheet 80 through opening 85 by the application of heat and pressure. I may also apply an adhesive 91 to the outer surface of sheet 82 of the reinforcement member to provide a light degree of adhesion between the same and the tear seal.

In the application of the tear seal to this type of sheet material, namely, a single layer of thermoplastic material, the reinforcement member 82 and tear seal 88 may be adhered together prior to being attached to the sheet in which case the reinforcement member would be joined to the sheet 80 at the same time that the tear seal is joined thereto.

By way of illustration in order to more clearly explain the basic principles involved in the tear seal constructions heretofore described, I show in FIG. 18 a basic tear seal construction. Referring to this figure, 101 designates a relatively thick sheet of thermoplastic material. On one side of this is applied a strip or sheet 102 of laminated plastic, the sheet having an inner layer 103 of a thermoplastic material and an outer layer 104 of a non-thermoplastic material which is relatively strongly resistant to stretching. An optional free tab 12 is shown in broken lines as a part of strip 102. A strip 105, similar to strip 102, having an inner layer 106 of thermoplastic material and an outer layer 107 of non-thermoplastic material is applied to the opposite side of sheet 101. These sheets are fused to sheet 101 by application of heat and pressure.

It is to be noted that the strips 102 and 105 are so disposed that they overlie adjoining sections of sheet 101 on opposite sides of the broken line 109 applied to the drawing. That is, edge 110 of strip 102 and edge 111 of strip 105 are substantially in the same plane.

With the construction described it will be apparent that the sheet 101 is reinforced against stretching on both sides of the line 109 leaving a narrow unreinforced region along this line. Therefore it is an easy matter to tear the sheet along line 109. This may be done by grasping the strips 102 and 105 and moving them in opposite directions away from each other, either in the plane of the sheet or at an angle thereto. The area of the sheet along 109 readily ruptures or tears when subjected to such pulling action.

It will be apparent that the tear seals shown in FIGS. 1–17 involve the principle shown in FIG. 18 and described immediately above, namely that the material to be torn is reinforced on opposite sides of a line or narrow region along which the tear is to be effected. Thus, for example, referring to FIG. 6, it will be seen that the strip 24 to be torn is reinforced by sheet 12 around opening 22 and reinforced within the opening by tear seal member 18. This leaves a narrow region at the edge of the opening 22 unreinforced, making it easy to effect a tearing action along such region.

In FIG. 19 I show a bag-like container 120 formed of two sheets of laminated material designated 121 and 122, respectively, each of which has an inner layer 123 of thermoplastic plastic. An opening 124 is provided in sheet 122 and closed by a thermoplastic inner member 125. In this case the tear seal member is relatively large and acts as a mounting for the container and may be in the form of a large sheet designated 127 consisting of an inner layer 128 of thermoplastic material and an outer layer 129 of different material. The layers 125 and 128 are joined by the application of heat and pressure to make a tear seal construction. This tear seal is similar to those discussed previously in that the tear seal member 127 must be stronger or more resistant to stretching than the inner thermoplastic member 125 in order to effectively break or tear out the inner member when the tear seal is pulled away. In building strength into the tear seal various methods may be employed. The thermoplastic member 128 may be of a heavier weight than the thermoplastic inner member 125 and it may be further supported by heat sealing to a fibrous material such as paper, of which layer 129 may be made, with the same heat and pressure which is used to seal the inner member 125 to the thermoplastic tear seal 128. Another method of producing strength in the tear seal 127 is by using a thermoplastic glue or cement as the layer 128 is firmly attached to a supporting layer 129 such as paper or other suitable material and then fusing this thermoplastic surface with the thermoplastic inner member 125. Under certain conditions when the inner thermoplastic member is of a particularly light weight material and where the size and shape of the resultant rupture or tearing of this member is not critical, it may be possible to simply seal it to a suitable non-thermoplastic surface such as paper 129 without the intermediate thermoplastic surface 128.

In this tear seal the inner liner 125 is applied over the opening 124 prior to the forming of the container 120 by the heat sealing of the inner thermoplastic layers 123 together. It may also be assumed that the container is formed, filled and sealed before the thermoplastic member 125 is sealed to the tear seal member 127. Therefore, the tear seal construction is produced by pressing the upper sheet 121, the inner member 125 and the tear seal member 127 together in the region of the tear seal opening 124. The contents of the bag utilizing this type tear seal is usually a liquid or cream which is readily displaced when this compression of surfaces takes place. It is apparent that under this heat sealing condition that all thermoplastic materials which fuse at the same temperature would become sealed together, and that the upper inside thermoplastic surface 123 would become sealed to the inner member 125. Usually this is undesirable since the proper sealing of the inner member 125 requires that it be sealed only to the stronger thermoplastic laminate 127 and not reinforced from within by also sealing to the supported thermoplastic sheet 123. Therefore, in FIG. 19 I show a "non-sealing" barrier sheet 130 opposite the tear seal and inside the sealed outer edges of the bag which keeps the surface 123 from sealing to the inner member 125 when the heat seal is applied. This non-sealing barrier may be any suitable flexible material which does not fuse or melt at the same low range as the thermoplastic materials employed in the container. It can be applied by printing on the surface, by mechanical means or by adhesive. Also, by creating certain open patterns within the area of the non-sealing barrier intermittent tear seals of unusual shape and design may be created between opposing thermoplastic surfaces even though equal heat and pressure is applied over the complete area.

It will also be noted that in FIG. 19 the entire thermoplastic area exposed through the opening 124 has not been fused together, but that the heat seal is centered within the opening. This variation in the design of the tear seal is usually only practical where relatively small openings are to be produced in the container for the gradual dispensing of liquids or creams. In opening this type of tear seal it is only necessary to grasp the container 120 and pull it away from the sheet 127.

In FIG. 20 I show a type of container made of two sheets of material 131 and 132 which may be joined at their margins 133 by the application of heat and pressure, the sheets being thermoplastic. Assuming that the sheets are made into a flat pouch or bag, this is then folded upon itself and the sheet 131 united with itself in the area 134 by the application of heat and pressure. Since this operation usually takes place after the pouch has been formed and filled, it is necessary that all four layers of the folded bag be pressed together under heat and pressure to produce the tear seal. A non-sealing barrier sheet 135 is placed within the bag in the region of the tear seal to keep sheets 131 and 132 from fusing together and yet permit sheet 131 to firmly fuse to itself at 134. Without the barrier all four layers of material would weld together and the opening action of the tear seal would be erratic. This erratic action is especially true of small tear seals where there is a tendency for the center of the weld area to tear out of the thermoplastic sheets as the container is unfolded with the perimeter of the weld area in the bag remaining secure and unopened. That is, sheets 131 and 132 remain completely sealed around the edge of the weld area, although the weld area itself pulled loose with the unfolding of the bag. With the barrier, the weld is confined to the inside sheet 131 and a positive opening is caused as the thermoplastic material is forced to tear around the edge of the heat seal 134 as the bag is unfolded. This tear seal is usually employed to produce one or more small openings in containers for the dispensing of liquids or creams.

A non-sealing barrier sheet 136 may also be applied to the outer surface of the container in the region of the tear seal to facilitate the application of heat and pressure without damage to the thermoplastic material 132.

While I am particularly concerned with a tear seal construction for plastic sheets of the thermoplastic type which can be joined or fused by the application of heat and pressure, it will be apparent that the basic construction is suitable where the plastic sheets either may or may not be thermoplastic but are capable of being united at ordinary temperatures by a solvent. Thus I contemplate a tear seal construction as hereinbefore described where the inner layer (or single layer) of the tear seal member is united to the inner layer or inner substitute layer of the container through the opening in an outer layer or reinforcement strip by chemical action. Instead of using heat and pressure in the method, I would then use a solvent compatible to joining the elements. In such case the outer layer of the container laminate sheet, or the outer layer of the reinforcement sheet, such as that shown in FIG. 16, would preferably be of a material which is not compatible to uniting with the other sheets in the presence of the solvent. However, this is not essential, since the area of applied solvent can be controlled.

Although I have illustrated and described a preferred form of my invention, I contemplate that various changes and modifications can be made therein without departing from the invention, the scope of which is indicated by the following claims. In this connection, while I have frequently referred herein to the joining or fusing of thermoplastic materials by application of heat and pressure, it is to be understood that such materials may be fused together by other heat-producing means as, for example, by using high frequency electrical energy.

I claim:

1. A tear seal construction for a thermoplastic sheet, comprising a stretch-resistant reinforcement member of sheet material attached to a surface of said thermoplastic sheet and having an opening through which said thermoplastic sheet is exposed, and a stretch-resistant tear seal strip overlying said opening and portions of the reinforcement member marginal thereto and having an inner portion of thermoplastic material united with substantially the entire exposed area of said thermoplastic sheet through said opening.

2. A tear seal construction as set forth in claim 1 in which said tear seal strip is laminated and comprises an inner layer of thermoplastic material and an outer layer of non-thermoplastic material.

3. A tear seal construction as set forth in claim 1 in which said inner portion of said tear seal strip is thicker than said thermoplastic sheet.

4. A tear seal construction as set forth in claim 1 in which said reinforcement member is coextensive with said sheet.

5. A tear seal construction for a plastic sheet or the like comprising a stretch-resistant reinforcement member of sheet material secured to a surface of said sheet, said reinforcement member having an opening through which a portion of said sheet is exposed, and a tear seal strip overlying said opening and integrally united with substantially the entire exposed area of said sheet through said opening.

6. A tear seal construction as set forth in claim 5 in which said reinforcement member is characterized by the quality of being incompatible to being fused or chemically united with said sheet, said tear seal strip being stronger than said sheet.

7. A tear seal construction as set forth in claim 5 in which said tear strip seal strip extends beyond said opening providing a free portion for manual operation.

8. A tear seal construction as set forth in claim 5 in which said sheet and at least the inner portion of said tear seal strip are of thermoplastic material and are fused together through said opening.

9. A tear seal construction for a laminated sheet comprising a layer of a given plastic on one side and a layer of a different material on the other side, said layer of different material having an opening therein through which said plastic layer is exposed, and a tear seal strip overlying said opening and integrally united with substantially the entire exposed area of said layer of given plastic through said opening.

10. A tear seal construction for a laminated sheet comprising a layer of a given plastic on one side and a layer of a different material on the other side, said sheet having an opening therethrough, a strip of said given plastic bonded to said layer of said given plastic on one side of said laminated sheet and covering said opening, and a tear seal strip of said given plastic on the other side of said sheet overlying said opening and the portion of said layer of different material marginal thereto, said tear seal strip being integrally united with said strip of said given plastic through said opening.

11. A tear seal construction as set forth in claim 10 in which said given plastic is of a thermoplastic type.

12. A tear seal construction as set forth in claim 10 in which said tear seal strip is thicker than said strip of said given plastic.

13. A tear seal construction as set forth in claim 10 in which said tear seal is a laminate comprising an inner layer of said given plastic of greater thickness than said strip of given plastic and an outer layer of a different material.

References Cited in the file of this patent

UNITED STATES PATENTS

| | | |
|---|---|---|
| 1,987,545 | Alexander | Jan. 8, 1935 |
| 2,400,390 | Cluman | May 14, 1946 |
| 2,554,160 | Von Gunter | May 22, 1951 |
| 2,568,463 | Reynolds | Sept. 18, 1951 |
| 2,595,678 | Levkoff | May 6, 1952 |
| 2,643,049 | Bartelt | June 23, 1953 |
| 2,715,089 | Michener | Aug. 9, 1955 |

FOREIGN PATENTS

| | | |
|---|---|---|
| 65,700 | Denmark | Oct. 22, 1941 |
| 637,411 | Great Britain | May 17, 1950 |